United States Patent [19]
Pluta

[11] Patent Number: 5,232,072
[45] Date of Patent: Aug. 3, 1993

[54] CENTER-FREE LARGE ROLLER BEARING

[75] Inventor: Dieter Pluta, Dortmund, Fed. Rep. of Germany

[73] Assignee: Hoesch AG, Dortmund, Fed. Rep. of Germany

[21] Appl. No.: 916,185

[22] Filed: Jan. 2, 1992

[30] Foreign Application Priority Data

Feb. 12, 1991 [DE] Fed. Rep. of Germany ....... 4104137

[51] Int. Cl.[5] .................. F16C 19/52; F16D 65/22
[52] U.S. Cl. .................................. 188/72.7; 188/82.8; 192/70; 192/93 R
[58] Field of Search ............ 188/71.1, 72.7, 72.1, 188/136, 166, 70 R, 82.8, 83, 84; 192/70, 70.23, 93 R; 384/620

[56] References Cited

U.S. PATENT DOCUMENTS

| | | | |
|---|---|---|---|
| 2,143,330 | 1/1939 | Pray | 188/82.8 |
| 3,228,493 | 1/1966 | Kershner | 192/93 R |
| 3,662,864 | 5/1972 | Evans | 188/72.7 X |
| 3,934,956 | 1/1976 | Pitner | 384/620 X |
| 4,099,601 | 7/1978 | Pittman | 188/71.1 X |
| 4,621,713 | 11/1986 | Carré et al. | 188/72.7 |
| 4,759,429 | 7/1988 | Margetts | 188/72.7 X |
| 5,000,303 | 3/1991 | Shoji et al. | 188/82.8 X |

FOREIGN PATENT DOCUMENTS

| | | |
|---|---|---|
| 3725972 | 2/1989 | Fed. Rep. of Germany. |
| 0511042 | 6/1976 | U.S.S.R. . |
| 0681269 | 8/1979 | U.S.S.R. . |

*Primary Examiner*—Robert J. Oberleitner
*Assistant Examiner*—Peter M. Poon
*Attorney, Agent, or Firm*—Max Fogiel

[57] ABSTRACT

A heavy-duty open-center anti-friction bearing (1), especially for mounting on generator sheds in wind-powered electricity-generating plants. It comprises two races (2 and 3) with friction-reducing structures (4) rolling between them and with a brake that suppresses rotations on the part of the bearing. The brake consists of at least one braking surface (19) secured to one bearing ring (3) and of a brake lining (16) secured non-rotating to the other bearing ring (2) and forced against the braking surface by a pressure-application mechanism (21). The mechanism can be adjusted from the outside. The object is to free the bearing of normal forces deriving from the brake. The pressure-application mechanism (21) has either a wedge-shaped tip (23) or a conical tip (22) that forces two brake jaws (13 and 14) accommodated on each side of it in a continuous recess (11) in the opposite ring (3 or 9) normal to the axis (24) of the pressure-application mechanism against two opposing braking surfaces (17 and 18) in the recess.

16 Claims, 2 Drawing Sheets

CENTER-FREE LARGE ROLLER BEARING

BACKGROUND OF THE INVENTION

The invention concerns a heavy-duty open-center anti-friction bearing, especially for mounting on generator sheds in wind-powered electricity-generating plants.

The anti-friction bearings employed for rotary connections in wind-powered electricity-generating plants tend to wear out relatively rapidly because their races develop grooves. The situation mainly derives from extremely small deflections adjusting for wind direction that cause the friction-reduction structures to scrape against the race. A similar situation occurs in structures that rotate on buoys, whereby the slight deflections are induced by the motion of the waves. Various means of eliminating such wear and tear by increasing the low resistance to rotation in anti-friction bearings are known. German 3 725 972 A1 for example proposes enclosing the mechanisms in an extra brake. The braking force and hence the desired resistance to rotation can be adjusted from outside. One drawback of such a design is the brake's resultant normal force, which is introduced between the rings to generate a braking moment, adding to the stress on the brake. The bearing must accordingly either be larger or shorter-lived.

SUMMARY OF THE INVENTION

The object of the invention is to improve the known anti-friction bearing rotary joint and brake by eliminating the normal force that the brake exerts on the bearing.

The particular advantage of the invention is that the bearing is no longer subjected to normal forces from the brake. Another advantage is that the requisite normal force is reduced by half through the use of two identical brake jaws that act on two surfaces.

BRIEF DESCRIPTION OF THE DRAWINGS

One embodiment of the invention will now be specified with reference to the drawing, wherein.

DESCRIPTION OF THE PREFERRED EMBODIMENTS

Figure 1:
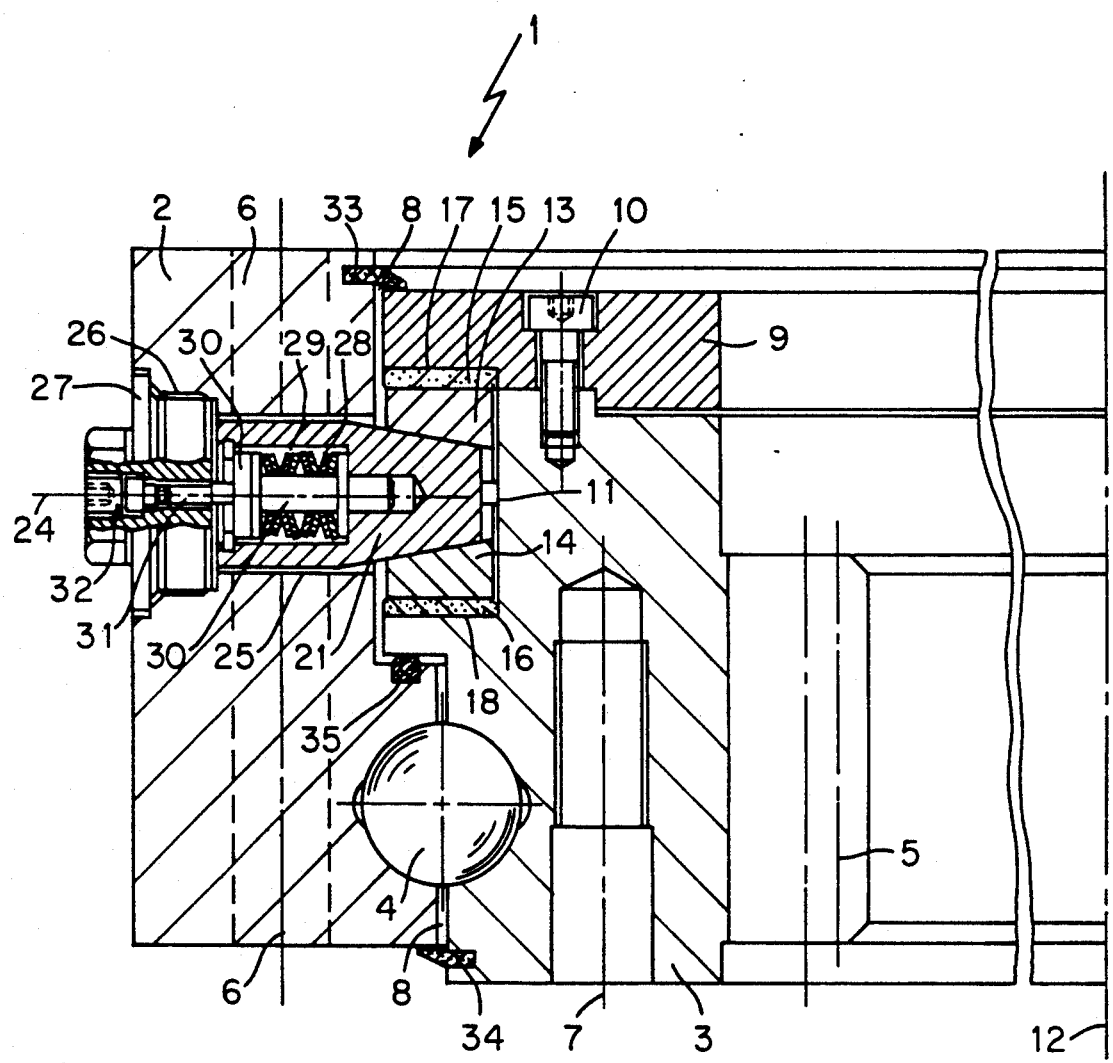
FIG. 1 is a section through half a bearing in accordance with the invention.

A heavy-duty anti-friction bearing 1 has an outer ring 2 on a first race and an inner ring 3 on a second race that rotate-against each other on friction-reduction structures 4 in the form of balls. Inner ring 3 has cogs 5 that engage the unillustrated pinion in a rotary transmission. Bearing 1 is secured to an unillustrated attachment by way of fastener bores 6 and 7. Between rings 2 and 3 is a gap 8. Inner ring 3 is accommodated in an accessory ring 9, to which it is secured by screws 10. The accessory ring 9 in the illustrated embodiment is a component of inner ring 3 for example. It could alternatively be integrated into the inner ring. It could also conceivably be part of the attachment.

Rings 3 and 9 demarcate a continuous recess 11 with a cross-section in the form of a U or L. Recess 11 accommodates two brake jaws 13 and 14 that move parallel with the axis 12 of the bearing. They could just as well move perpendicular or at a different angle to the axis. Brake jaws 13 and 14 are surfaced with brake linings 15 and 16 that operate in conjunction with braking surfaces 17 and 18 on inner ring 3 and accessory ring 9.

Pressure-application mechanisms 21 with either a conical tip 22 or a wedge-shaped tip 23 engage matching conical apertures 19 or wedge-shaped apertures 20 that extend half-way through brake jaws 13 and 14.

Pressure-application mechanism 21 moves along its axis 24 perpendicular to the direction that brake jaws 13 and 14 move in. The mechanism is accommodated in a recess 25 in outer ring 2. Recess 25 continues out in the form of a close-off bore 26 and extends all the way through outer ring 2. Pressure-application mechanism 21 rests on springs 28 against an obstruction screw 27 in close-off bore 26. The springs in the illustrated embodiment are cup springs accommodated in a bore 29 in pressure-application mechanism 21. Springs 28 do not rest directly against obstruction screw 27 but by way of a force-application pin 30 that can be adjusted with a setscrew 31 at the center of obstruction screw 27. The tension exerted by springs 28 can accordingly be adjusted more or less to allow pressure-application mechanism 21 to generate a variable normal force on braking surfaces 17 and 18 through brake jaws 13 and 14. The approach also corrects for tolerance and allows readjustment of brake linings 15 and 16 when they become worn. Setscrew 31 can be adjusted and lubricated by initially setting a seal-tight screw 32. The overall system is sealed off at the top and bottom of the gap with lip seals 33 and 34. Another seal 35 is accommodated in gap 8 between friction-reduction structures 4 and recess 25. This approach keeps lubricant, preferably bearing grease, out of the brake and keeps any material rubbing off the brake jaws out of the bearing.

Figure 2:
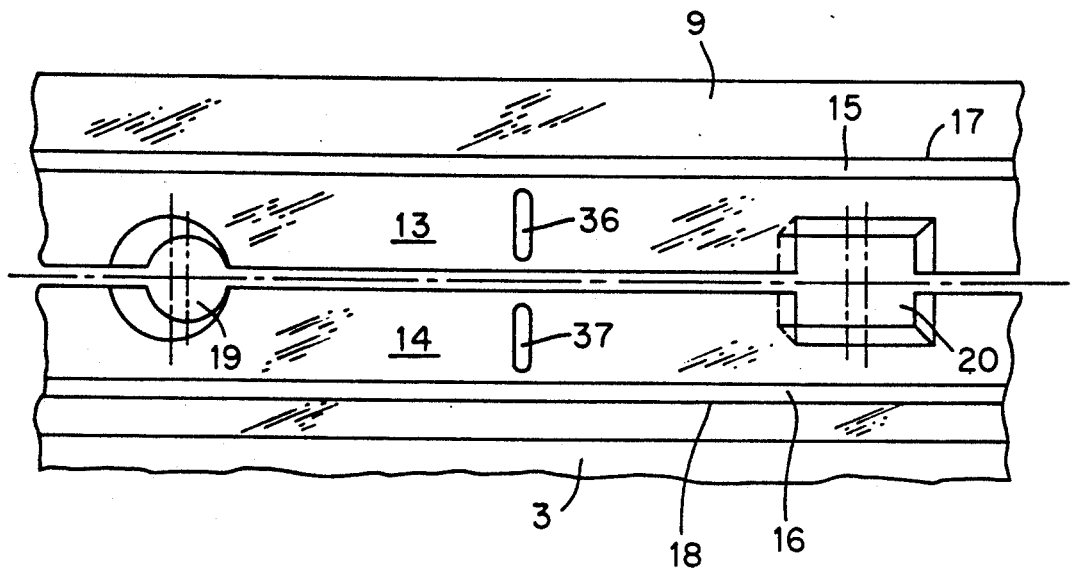
FIG. 2 is a view of one section of the inner ring as seen from the gap.
Figure 3:
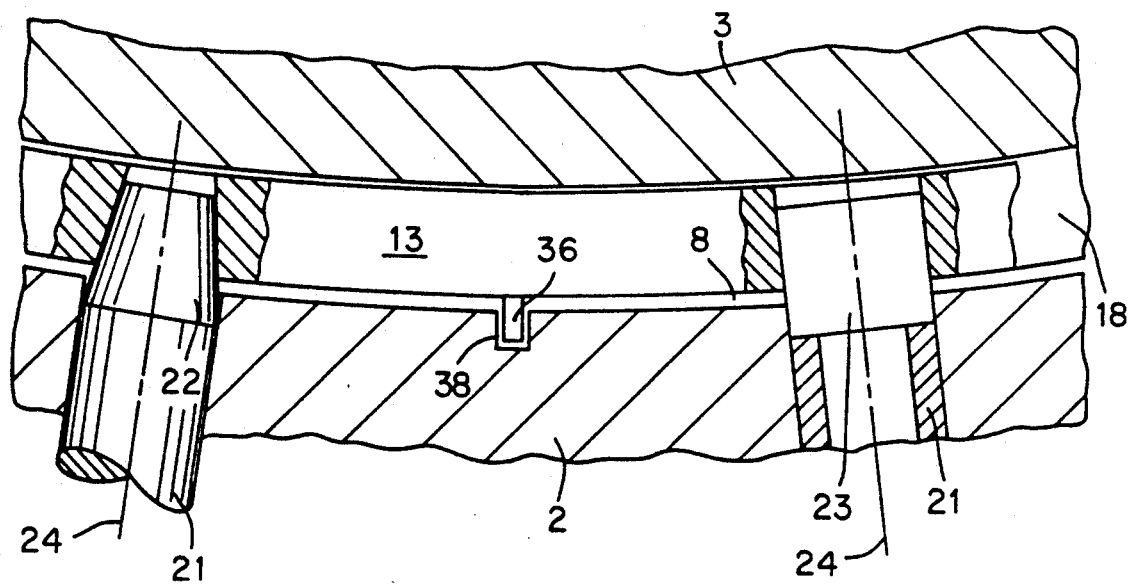
FIG. 3 is a top view of a brake jaw and its vicinity.

As illustrated in FIGS. 2 and 3, brake jaws 13 and 14 can have travelers 36 and 37 that fit into grooves 38 in the outer ring. This feature separates the function of transmitting the braking moment from brake jaws 13 and 14 to the associated outer ring 2 from the function of expanding the jaws.

I claim:

1. A heavy-duty open-center large roller bearing for machine housings of wind-powered arrangements, comprising: two races; roller elements rolling between said races; a brake for damping rotational oscillations of the bearing and having at least one braking surface secured to one bearing ring on one of said races and having a brake-lining secured non-rotatingly to another bearing ring on the other one of said races; pressing means for pressing said brake-lining against said braking surface and having an axis; means for adjusting said pressing means from the outside; a wedge-shaped tip on said pressing means; two brake jaws on opposite sides of said wedge-shaped tip and forced by said tip in a continuous recess in said one bearing ring and normal to said axis of said pressing means; two opposite braking surfaces in said recess, said two brake jaws being pressed apart and against said two opposite braking surfaces in said recess by said pressing means through said wedge-shaped tip, said two brake jaws being pressed apart and against said two opposite braking surfaces in said recess by said wedge-shaped tip.

2. A heavy-duty open-center large roller bearing as defined in claim 1, wherein said recess has a U-shaped cross-section.

3. A heavy-duty open-center large roller bearing as defined in claim 1, wherein said recess has an L-shaped cross-section and is mounted on a surface of said one bearing ring.

4. A heavy-duty open-center large roller bearing as defined in claim 1, including a seal between said roller elements and said brake jaws for sealing a gap between said races.

5. A heavy-duty open-center large roller bearing as defined in claim 1, including spring means for forcing said pressing means between said brake jaws.

6. A heavy-duty open-center large roller bearing as defined in claim 1, wherein said brake jaws are non-rotationally connected to said other bearing ring through said pressing means.

7. A heavy-duty open-center large roller bearing as defined in claim 6, including travel take-along elements in said other bearing ring.

8. A heavy-duty open-center large roller bearing for machine housings of wind-powered arrangements, comprising: two races; roller elements rolling between said races; a brake for damping rotational oscillations of the bearing and having at least one braking surface secured to one bearing ring on one of said races and having a brake-lining secured non-rotatly to another bearing ring on the other one of said races; pressing means for pressing said brake-lining against said braking surface and having an axis; means for adjusting said pressing means from the outside; a conical tip on said pressing means; two brake jaws on opposite sides of said conical tip and forced by said conical tip in a continuous recess in said one bearing ring and normal to said axis of said pressing means; two opposite braking surfaces in said recess, said two brake jaws being pressed apart and against said two opposite braking surfaces in said recess by said pressing means through said conical tip, said two brake jaws being pressed apart and against said two opposite braking surfaces in said recess by said conical tip.

9. A heavy-duty open-center large roller bearing as defined in claim 8, wherein said recess has a U-shaped cross-section.

10. A heavy-duty open-center large roller bearing as defined in claim 8, wherein said recess has an L-shaped cross-section and is mounted on a surface of said one bearing ring.

11. A heavy-duty open-center large roller bearing as defined in claim 8, including a seal between said roller elements and said brake jaws for sealing a gap between said races.

12. A heavy-duty open-center large roller bearing as defined in claim 8, including spring means for forcing said pressing means between said brake jaws.

13. A heavy-duty open-center large roller bearing as defined in claim 8, wherein said brake jaws are non-rotationally connected to said other bearing ring through said pressing means.

14. A heavy-duty open-center large roller bearing as defined in claim 13, including travel take-along elements in said other bearing ring.

15. A heavy-duty open-center large roller bearing as defined in claim 8, wherein said recess has a U-shaped cross-section; a seal between said roller elements and said brake jaws for sealing a gap between said races; spring means for forcing said pressing means between said brake jaws; said brake jaws being non-rotationally connected to said other bearing ring through said pressing means; and travel take-along elements in said other bearing ring.

16. A heavy-duty open-center large roller bearing for machine housings of wind-powered arrangements, comprising: two races; roller elements rolling between said races; a brake for damping rotational oscillations of the bearing and having at least one braking surface secured to one bearing ring on one of said races and having a brake-lining secured non-rotatingly to another bearing ring on the other one of said races; pressing means for pressing said brake-lining against said braking surface and having an axis; means for adjusting said pressing means from the outside; a wedge-shaped tip on said pressing means; two brake jaws on opposite sides of said wedge-shaped tip and forced by said tip in a continuous recess in said one bearing ring and normal to said axis of said pressing means; two opposite braking surfaces in said recess, said two brake jaws being pressed apart and against said two opposite braking surfaces in said recess by said pressing means through said wedge-shaped tip, said two brake jaws being pressed apart and against said two opposite braking surfaces in said recess by said wedge-shaped tip; said recess having a U-shaped cross-section; a seal between said roller elements and said brake jaws for sealing a gap between said races; spring means for forcing said pressing means between said brake jaws; said brake jaws being non-rotationally connected to said other bearing ring through said pressing means; and travel take-along elements in said other bearing ring.

* * * * *